PORTABLE COLOR TELEVISION SYSTEM

Filed Sept. 12, 1955

5 Sheets-Sheet 1

INVENTORS
Victor Graziano
BY James R. Lincicome
Mueller & Aichele
Attys.

Aug. 16, 1960 V. GRAZIANO ET AL 2,949,605

PORTABLE COLOR TELEVISION SYSTEM

Filed Sept. 12, 1955

5 Sheets-Sheet 2

INVENTORS
Victor Graziano
James R. Lincicome

BY Mueller & Aichele
Attys.

INVENTORS
Victor Graziano
James R. Lincicome
BY
Mueller & Aichele
Attys.

INVENTORS
Victor Graziano
James R. Lincicome
BY Mueller & Aichele
Attys.

INVENTORS
Victor Graziano
BY James R. Lincicome
Mueller & Aichele
Atty.

2,949,605

PORTABLE COLOR TELEVISION SYSTEM

Victor Graziano, Oak Park, and James R. Lincicome, Glen Ellyn, Ill., assignors to Motorola, Inc., Chicago, Ill., a corporation of Illinois Filed Sept. 12, 1955, Ser. No. 533,802

12 Claims. (Cl. 343—202)

This application relates generally to television transmission systems and particularly to such a system operating at microwave frequencies for transmitting wide band color television signals.

Systems for transmitting black and white or monochrome television signals have been used for a relatively long period of time and although it is necessary to provide a relatively wide band and hold distortion to a low level, the tolerances permitted are much greater than for color television. This is because in black and white, distortion may appear principally as a slightly different shade of gray which is difficult to detect. However, in color, distortions produce differences in shades of color which may be quite apparent particularly in commonly seen items such as the human face or green grass. Further, the color television signal is divided into two components, the luminance and chrominance components, and unless these two are held in very close correspondence distortion results.

The luminance component of the color signal is transmitted as a wide band video signal which corresponds generally to the monochrome signal. The chrominance component on the other hand, which represents the hue and saturation of the color, is transmitted as phase and amplitude modulation, respectively, of a subcarrier wave. The hue transmitted by the phase modulation indicates whether the color is red, blue, green or a combination thereof, and the saturation produced by the amplitude modulation indicates whether the color is of a diluted or pastel shade, or a strong shade. The wideband video signal with the luminance information extends from about 30 cycles to about 4.3 megacycles. The subcarrier with the chrominance information is normally at 3.58 megacycles in the system presently standardized. The luminance single bands are interleaved with the color side bands in a manner that the color information tends to cancel out in standard monochrome receivers.

It will be apparent when considering the above system that in order for the luminance and chrominance components of a particular point to appear at the same time, the various components of the signal when transmitted through a system must have the same delay so that all are reproduced at the same instant. Further the frequency response of the equipment must be held very close to a uniform level so that the chrominance and luminance components are reproduced with the same relative levels. The relative gain of the color subcarrier amplitude must be constant at various amplitude levels so that variations in saturation of the colors are accurately reproduced. Likewise, the changes in phase of the subcarrier for various amplitude levels must be constant so that the variations in hue are the same regardless of the dilution or strength of the colors.

It is well known that electronic systems have distortion with the distortion of active elements depending upon both amplitude and frequency, and the distortion of passive elements depending only on frequency. However, in frequency molulation systems, frequency distortion produced by passive elements will also appear as amplitude distortions in the recovered signals. It will be apparent that such distortions will be highly objectionable in color television systems.

It is therefore an object of the present invention to provide a transmission system suitable for use in color television wherein the distortion resulting from variations in delay of signals of different frequencies, variations in the response at different frequencies, and/or variations in gain and in phase with signals of different levels are reduced or eliminated.

A further object of the invention is to provide a simple amplifier circuit which provides a flat response over a wideband and which may be easily adjusted to control the response in different portions of the band.

Another object of the invention is to provide a circuit for compensating for differential gain produced by various parts of the system so that the over-all differential gain of the system is held substantially level.

Still another object of the invention is to provide an arrangement for balancing out the low frequency disturbances picked up by the cables which interconnect remotely located units of a color television transmission system.

A still further object of the invention is to provide a microwave relay system for transmission of color television signals wherein the equipment has built in provisions for calibrating and adjusting the deviation of the microwave carrier and the response thereto by the receiver of the system.

Yet another object of the invention is to provide a color television system which transmits both the color video signal including the luminance and chrominance components, and also audio signals provided as frequency modulation of a separate subcarrier, and in which cross talk of the video signal into the audio signal is eliminated.

Still another object of the invention is to provide a microwave relay system for color television use which is provided in portable form wherein the equipment can be easily set up at a remote point with the antennas directed in vertical or horizontal directions as may be most desirable for a particular broadcasting position.

A feature of the invention is the provision of a color television system wherein the frequency response is held uniform by the use of a negative feedback amplifier having a very simple feedback network with adjustments for separately controlling the response at the low frequency portion of the band, the mid-frequency portion, and the high frequency portion.

Another feature of the invention is the provision of a differential gain linearizing circuit for compensating for variations in the differential gain of the system wherein a non-linear diode is connected to the cathode of a cathode follower output stage to provide non-linear loading so that the gain characteristics of the cathode follower complement the differential gain characteristics of the system to level the over-all differential gain.

A further feature of the invention is the provision of a single ended coupling system between remotely located components wherein the pickup of the unbalanced cable is balanced out by the pickup from a dummy cable of the same characteristics, to thereby eliminate undesirable low frequency noise picked up by the cable and at the same time retain the advantages of single ended systems.

A still further feature of the invention is the provision of a color television microwave relay system wherein the picture signal and the audio signal are transmitted together with the audio signal frequency modulating subcarrier wave outside the band of the video signal, and in which the local oscillator of the audio receiver is frequency modulated by the picture signal to balance out phase modulation of the audio subcarrier by the picture signal during transmission.

Still another feature of the invention is the provision of a microwave relay system wherein a test oscillator is built into the system for providing signals of fixed levels which are monitored at the output of the frequency modulator to set the gain of the transmitter amplifier to provide the desired deviation of the frequency modulated wave with the test signals also being monitored at the receiver output to set the gain of the receiver amplifier.

Yet another feature of the invention is the provision of a color television radio relay system which is constructed in portable form with the transmitter and receiver microwave units being mounted on tripods and including antennas which may be directed at each other for line of sight communication, with the units being so constructed that the antennas can be mounted for direct horizontal communication or for vertical communication using reflectors. Various units may be located at different locations and interconnected through multiconductor cables of improved construction.

Further objects, features and the attending advantages of the invention will be apparent from a consideration of the following description when taken in connection with the accompanying drawings wherein.

Figures 1, 4, 5:
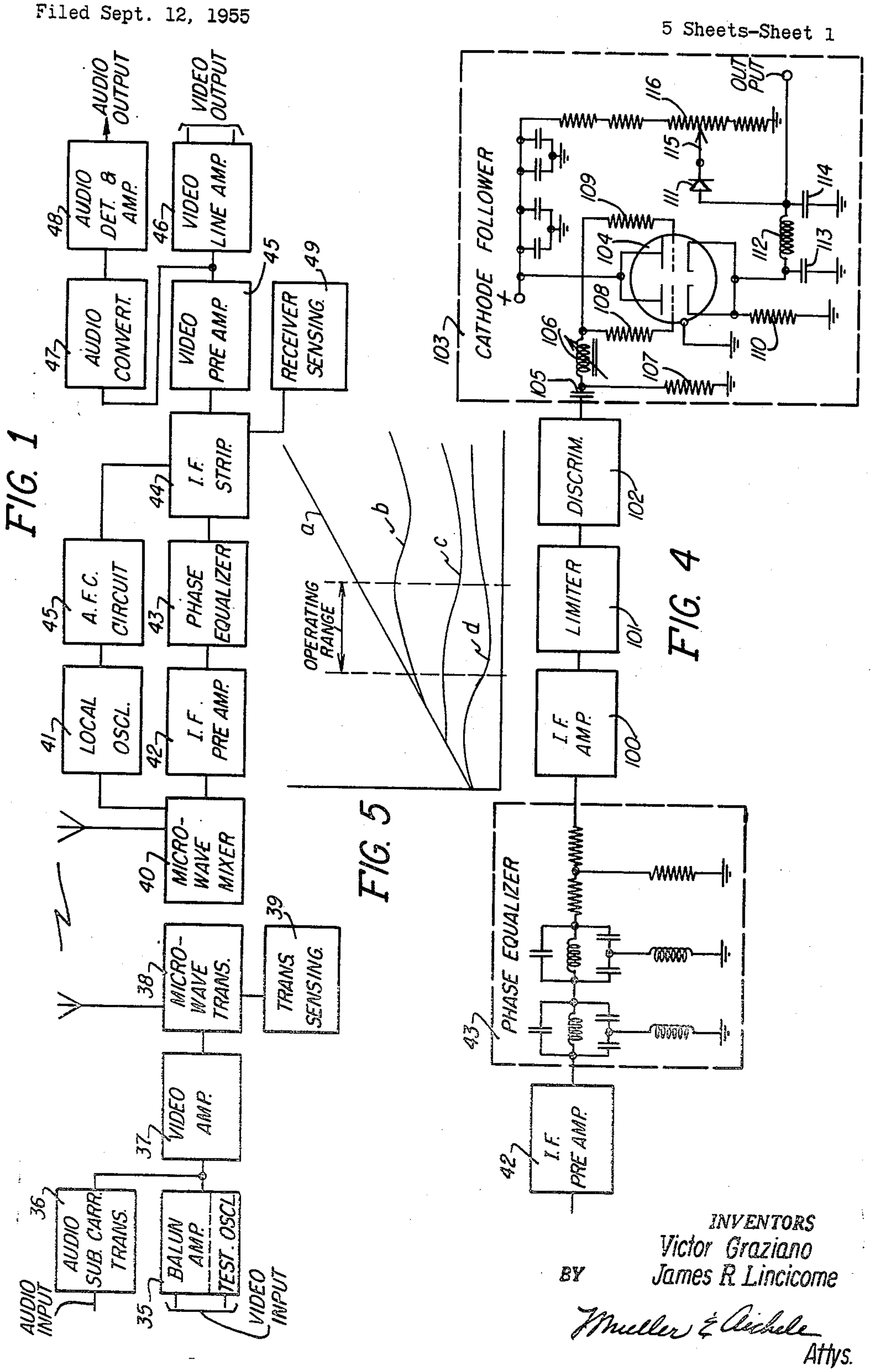
Fig. 1 is a block diagram of the system in accordance with the invention.
Fig. 4 illustrates the intermediate frequency amplifier, phase equalizer and IF strip of the receiver.
Fig. 5 is a curve chart illustrating operation of the differential gain compensating circuit of Fig. 4.

In practicing the invention there is provided a color television microwave relay system wherein the color television signal is first amplified in a balanced amplifier, then applied to a video amplifier having a flat response over a wide frequency band, and then applied to the microwave modulator. A subcarrier frequency modulated by sound signals may also be applied to the wide band video amplifier and applied to the microwave modulator. The transmitting equipment described may be packaged for fixed installation or may be packaged for portable use wherein the microwave transmitter and video amplifier are mounted in a housing which may be supported on a tripod with an antenna and reflector supported directly on the housing of the equipment. The balanced amplifier may be remote from the video amplifier and connected thereto through a multiconductive cable which is provided on a reel to facilitate the use of any desired amount of cable which may be required. To eliminate low frequency signals picked up by the cable, a dummy line may be provided having the same characteristics as the connecting cable, and the signal from the dummy line may be used to balance out the signals picked up by the connecting cable. This permits the use of a single ended system and simplifies equalization.

The receiver includes a crystal mixer to which local oscillations are provided from an oscillation source such as a klystron. The intermediate frequency signals are first applied to a pre-amplifier, then through a phase equalizing network, and then to an intermediate frequency amplifier, a detector and an output circuit for linearizing the differential gain of the system up through the detector. A control voltage may be derived from the detector for providing automatic frequency control to the local oscillator of the receiver. The video signal derived from the detector is first amplified in a pre-amplifier and then in a video line amplifier having negative feedback to provide a flat response over a very wide band. The audio subcarrier may be derived from the video pre-amplifier and reduced in frequency through a converter which balances out the video phase modulation of the audio subcarrier. The audio signal is then detected and amplified to provide the audio output. The receiving equipment may also be provided for a fixed installation or in a portable form which can be easily transported and set up at a desired location.

A test oscillator may also be provided in the transmitter for applying signals at fixed levels through the video amplifier to the modulator. The output of the modulator may be monitored to permit adjusting the video amplifier to provide the desired deviation of the carrier wave. The output of the receiver may be monitored at fixed deviation for setting the gain of the receiver. A plurality of transmitter and receiver units may be connected in a multiple link relay system by connecting from one receiver into the transmitter of the next unit, when it is necessary to relay signals over long distances.

Referring now to the drawings, in Fig. 1 a block diagram of the over-all system is shown. A balanced video signal is applied from the television camera equipment to the balun amplifier 35. This amplifier may include on the same chassis therewith a test oscillator which will be described more in detail. The audio signal may likewise be applied to a subcarrier transmitter 36 which modulates the audio signal on a subcarrier wave which may have a frequency of 6.7 megacycles. The frequency modulated subcarrier wave and the video signal from the balun amplifier are combined and applied to video amplifier 37. This video amplifier has very uniform gain characteristics over a wide frequency range, and includes a simplified feedback circuit permitting adjustment of the gain characteristics at various portions of the range to provide the desired over-all response. The output of the video amplfiier is applied to the microwave transmitter 38 which may include a klystron tube for producing a microwave carrier which is frequency modulated by the signals from the video amplifier. The klyston may be connected to a wave guide antenna for radiating signals to the receiver of the system. A power sensing circuit 39 is connected to the transmitter to indicate proper operation thereof. The microwave transmitter may also include frequency deviation calibrating means as will be described more in detail.

The receiver includes a microwave crystal mixer 40 which mixes the received wave with the wave from the local oscillator 41 to provide an intermediate frequency signal. The intermediate frequency signal is first applied to the intermediate frequency pre-amplifier 42, and through the phase equalizer 43 to the IF strip 44 which includes a detector. The IF strip also includes a differential gain linearizing circuit to level out the differential gain of the entire system up through the detector of the IF strip 44. The detector of the IF strip 44 may provide a control signal to the automatic frequency control circuit 45 which modulates the local oscillator 41 to compensate for deviations of the received wave so that the intermediate frequency signal is held to the center frequency of the intermediate frequency amplifier. The output of the IF strip 44 is also fed to the video preamplifier 45 at the output of which the audio subcarrier wave and the video signal may be separately derived. The video signal is applied through video line amplifier 46 which has very uniform response over a wide frequency band. A receiver sensing circuit may be connected to the IF strip to indicate proper operation of the receiver.

The audio signal at the output of the video preamplifier is applied to audio converter 47 which reduces the frequency thereof to a lower frequency. The converter includes means for deriving a portion of the video signal and for utilizing the same to frequency modulate the local oscillator of the converter to thereby balance out phase modulation of the audio signal produced during the microwave transmission and reception process. The output of the audio converter is applied to the audio detector and amplifier 48 which derives the audio wave and amplifies the same to the required level for utilization in further equipment.

Figures 2, 3:
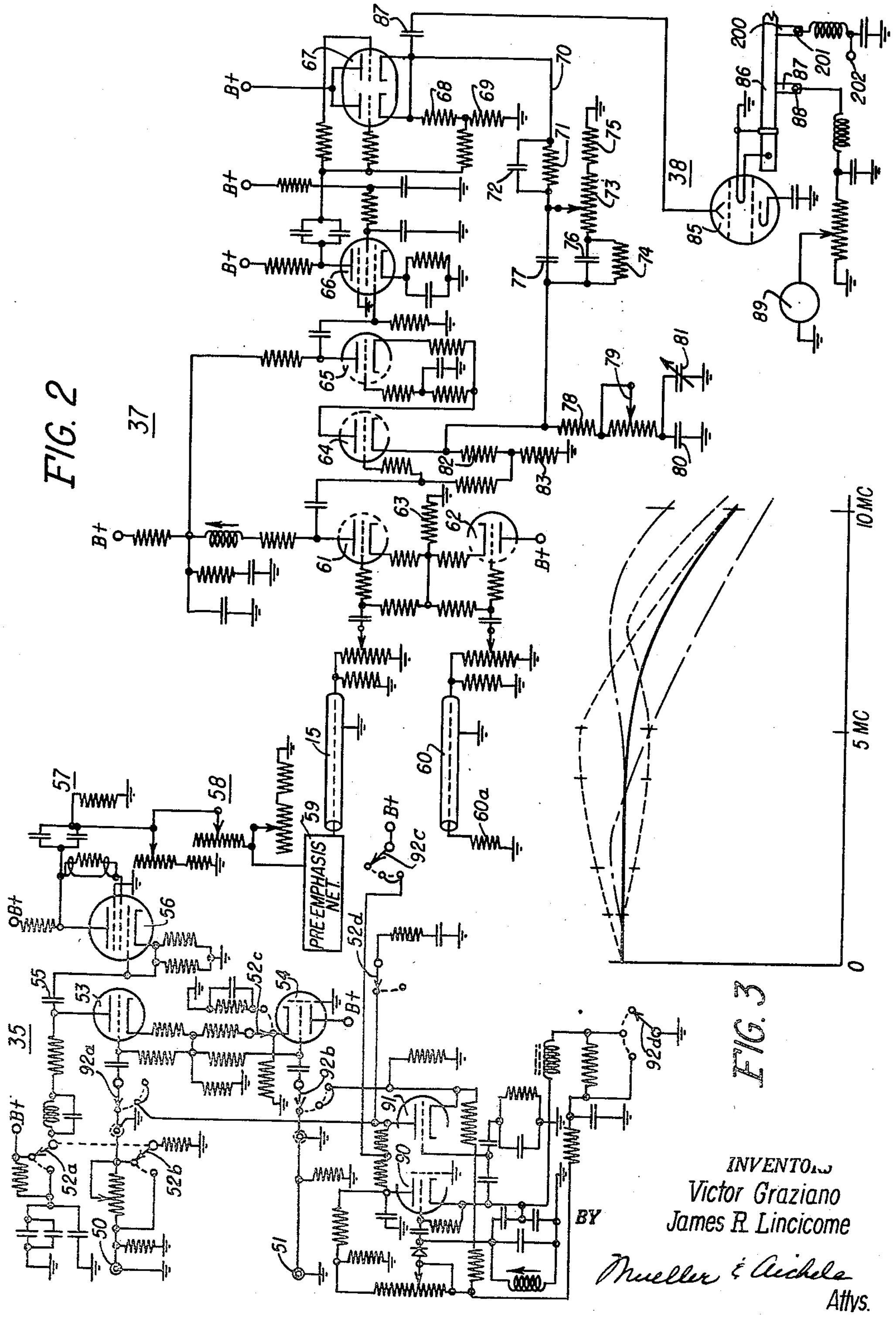
Fig. 2 illustrates the amplifier and modulator of the transmitter.
Fig. 3 is a curve chart illustrating operation of the feedback amplifier of Fig. 2.

Fig. 2 shows more in detail the circuit of the balun amplifier and test oscillator 35, the video amplifier 37, and the klystron transmitter 38 which forms the transmitter of the microwave relay system and which is shown in block diagram in Fig. 1. The balun amplifier includes input terminals 50 and 51 to which a video signal may be applied from equipment having a balanced output. The amplifier may also be used with equipment having a single ended output in which case connection is made only to the terminal 50. Switch 52 having contacts 52*a*, 52*b*, 52*c* and 52*d* are provided for making the required change in connections when changing from a single ended to a double ended input. The switches are shown in the position for use with a balanced input, and in the dotted positions provide the required connections for a single ended input. It will be apparent that with the connections shown, the balanced video signal is applied to the grids of the tubes 53 and 54. The output of the amplifier is applied through capacitor 55 to the output amplifier 56.

The output of the amplifier 56 is applied through a coupling network 57 to a gain control circuit 58 which applies the signals to a pre-emphasis network 59. The pre-emphasis network reduces the amplitude of the signals below 2 megacycles, with signals below 500 kilocycles being reduced 6 decibels. The output of the pre-emphasis network is coupled through the coaxial cable 15 to the video amplifier 37. It may be desirable to separate these components by a considerable amount so that a long cable may be required.

As previously stated, a dummy line 60 may be provided alongside the interconnecting cable 15 and may be terminated at the location of the balun amplifier in a resistor 60*a* having the characteristic impedance of the line 60. The input from the connecting line 15 and the dummy line 60 are applied respectively to the grids of input amplifier tubes 61 and 62. The amplifier 61 will therefore receive both the desired video signals and also any signals picked up by the cable 15 in the space between the balun amplifier and the video amplifier. The amplifier 62 has no video signal applied thereto and therefore will have applied to its grid only the low frequency signals picked up by the dummy line 60. The input amplifiers 61 and 62 have the cathodes connected through common resistor 63 which is effective to balance out the low frequency signals picked up by the cables to thereby reduce the low frequency disturbances normally provided.

By the use of the dummy line and the noise balancing effect thereof, single ended amplifiers can be used instead of balanced amplifiers as generally required. The use of single ended amplifiers presents an important advantage since equalization circuits therefor are much simpler and do not require precisely balanced bridge networks as required for balanced amplifiers.

The output of the input amplifier 61 is applied to an amplifier section including the cascode amplifier having triodes 64 and 65, the pentode amplifier 66, and the cathode follower output stage 67. This amplifier section is constructed to provide very uniform gain through the entire frequency range of the signals applied thereto, 30 cycles to 7 megacycles, and this is accomplished by the use of negative feedback. An attenuating network couples the cathode or emission electrode of the cathode follower stage 67 to the cathode of the triode 64 and provides negative feedback therebetween. Accordingly the signals developed across the cathode follower resistors 68 and 69 are applied through conductor 70 of the feedback network to the parallel resistor-capacitor combination 71, 72. These series elements together with the shunt elements of the feedback network attenuate the voltage fed back. The circuit including resistors 73, 74 and 75 and condenser 76 operates to adjust the low frequency attenuation, with the higher frequencies being by-passed through condenser 77. Accordingly, adjustment of the resistor 73 controls the low frequency attenuation through the feedback circuit.

The series circuit including resistors 78 and 79 and capacitors 80 and 81 controls the attenuation of mid frequency and high frequency components in the feedback circuit. Adjustment of capacitor 81 determines the crossover of the feedback network and controls the frequency response in the mid-band region. As the frequency becomes higher the reactance of the capacitors 80 and 81 becomes negligible and the resistors 78 and 79 control the high frequency response. Accordingly, adjustment of resistor 79 serves to control the high frequency response. The feedback network applies a signal to the cathode of the tube 64 in a sense to reduce the level of the signals therein. Since the gain of the amplifier section is very high, the frequency characteristics thereof are controlled almost entirely by the feedback circuit. The feedback circuit includes relatively few elements and yet permits separate adjustment of the attenuation of the feedback circuit, and therefore the amplifier response, at low frequencies, mid frequencies and high frequencies. This makes it possible to provide very uniform all-over response of the video amplifier.

The curves of Fig. 3 illustrate the response of the circuit resulting from variation of resistor 79 and capacitor 81 of the circuit of Fig. 2. The solid line curve shows adjustment for uniform response over a wide band and it will be apparent that the response is substantially uniform up to about 7 megacycles. The dot-dash curves show the range of amplitudes possible by variation of the resistor 79. The dotted curves show the response obtained by variation of capacitor 81. Although the change in response is not isolated to any one part of the curve, the principal effect of variation of the resistor 79 is at the high frequency end of the band, and the principal effect of variation of capacitor 81 is at the mid frequency portion of the band.

The microwave modulator 38, also shown in Fig. 2, includes a klystron 85 which is coupled to a wave guide 86. The klystron may be tuned to provide the desired frequency, and the video signal from the cathode follower stage 67 is applied to the repeller of the klystron through condenser 87 to frequency modulate the klystron in accordance with this video signal. As previously stated the signals may include both the wide band color signal and a subcarrier frequency modulated by the audio signal. Since the color signal includes a wide band signal and a subcarrier, the entire signal is made up of the wide band signal and two subcarriers. The wave guide 86 may be connected to a wave guide antenna which radiates the signal to the receiver of the relay link.

As previously stated, a test oscillator is included on the chassis with balun amplifier 35. This oscillator includes a triode tube 90 connected in an oscillator circuit having a frequency of the order of 2 megacycles. The output of the oscillator is applied to a phase splitter triode 91 which provides signals of equal and opposite phase to the amplifiers 53 and 54 of the balanced amplifier. A switch 92 is provided having contact levels 92*a*, 92*b*, 92*c*, and 92*d*. In the first position the oscillator is de-energized and disconnected from the tubes of the amplifier. In the second position the oscillator is energized and connected to provide oscillations of a first predetermined amplitude. In the third position the oscillator is energized and connected to provide oscillations of a lower amplitude. The oscillations are applied through the amplifiers 35 and 37 to the klystron transmitter 38.

Connected to the wave guide 86 in the transmitter is a directional coupler 87 having a waveguide cavity filter and a crystal detector 88 therein which applies signals through a coupling network to meter 89.

It has been found that when an extremely high frequency deviation of the carrier is produced, the amplitude of the carrier wave will be reduced and the meter 89 will produce a dip. This takes place when the deviation is 2.4 times the modulating frequency. The output of the test oscillator is arranged so that when the switch 92 is in the second position and the amplifiers 35 and 37 have the proper gain, the deviation of the klystron will be at the point producing the dip. The 2 megacycle test signal will have harmonics thereon which will tend to reduce this effect, but a sufficient dip is produced which can be easily detected on the meter. Accordingly, the gain of the amplifier system can be adjusted during the testing operation, as by adjustment of the circuit 58, so that the desired gain is produced. The test oscillator can be operated at its lower level to produce normal deviation which may be used to calibrate the receiver as will be more fully explained.

Fig. 4 illustrates more in detail the circuit for the intermediate frequency amplifier of the microwave receiver. The pre-amplifier 42 is couplied to phase-equalizer 43 which equalizes the phase delay of the various frequencies of the signal applied therethrough. The IF strip 44 of Fig. 2 includes an amplifier section 100 which may have a plurality of stages, a limiter section 101 which also may have a plurality of stages, and a discriminator 102 for deriving the modulation from the microwave carrier. The IF strip includes a cathode follower output stage 103 to which the detected signals are applied. The cathode follower stage includes the double triode tube 104, the two sections of which are connected in parallel. Input signals are applied through the coupling circuit including condenser 105, inductor 106 and resistor 107, and through resistor 108 to the grid of one section, and through resistor 109 to the grid of the other section. The output signal is developed across resistor 110 connected to the cathodes of the two stages.

In order to correct for variations in the differential gain of the system, a compensating network is provided in the cathode follower stage 103. By differential gain is meant the differential of the curve showing the gain characteristic of the system at different amplitude levels; that is, the change in the gain of the system as the signals applied thereto are at different amplitudes. The differential gain of the various stages of the system may be arranged to partially compensate for each other in an attempt to hold the differential gain constant. However, by using amplifier constructions available, complete cancellation cannot be obtained and a straight line differential curve may be provided as shown by curve *a* in Fig. 5. To compensate for this, a non-linear diode rectifier 111 is connected to the cathodes of the triodes 104 through the filter including coil 112 and condensers 113 and 114. A variable bias is provided to the diode 111 through the variable tap connection 115 on potentiometer 115 connected between B plus and ground. By adjusting the bias of the diode 111 so that the diode conducts at a level below or in the operating range of the cathode follower, the diode provides variable loading on the cathode follower so that the gain changes with the operating level to compensate for the differential gain characteristic of the system. The resulting characteristics are shown by the curves *b*, *c* and *d* in Fig. 5, with these curves showing the resultant differential gain with the bias set at different values. It will be apparent that effective compensation may be provided by this circuit wherein a non-linear impedance is connected to the cathode follower.

Figure 6:
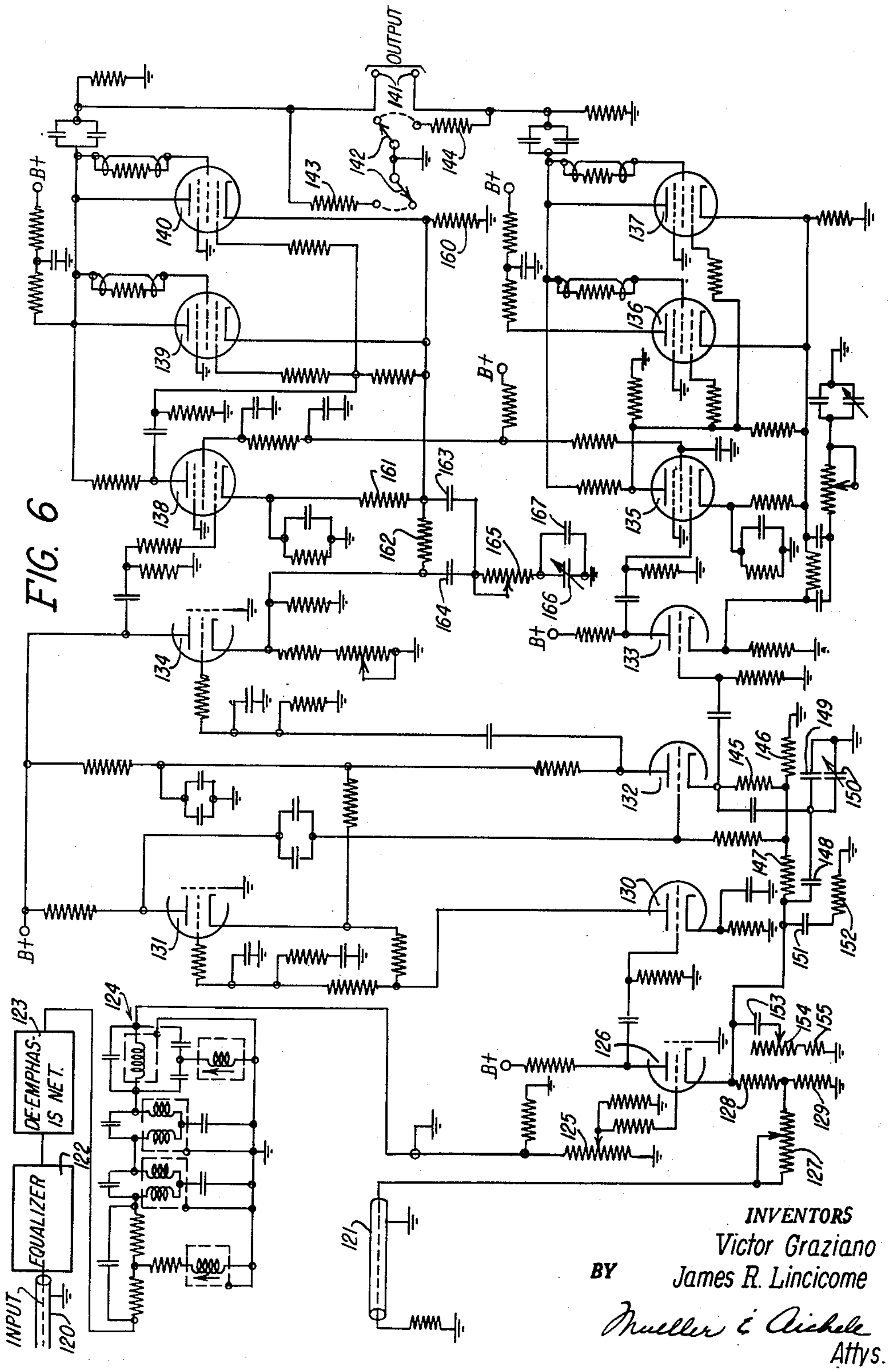
Fig. 6 is a circuit diagram of the video line amplifier of the receiver.

Fig. 6 is a detailed circuit diagram of the video line amplifier 46 of the system of Fig. 1. The output of the video preamplifier 45 is applied through cable 120 to the line amplifier. A dummy cable 121 which is identical to cable 120 is provided therealong so that the low frequency disturbances picked up in the two cables are substantially the same. The input from cable 120 is applied through equalizer 122 to a de-emphasis network 123 which has an effect substantially complementary to that of the pre-emphasis network 59 in the balun amplifier. The signals are then applied through system equalizer 124 and through the gain control potentiometer 125 to the input amplifier stage including the triode tube 126. The input from the dummy line 121 is applied through variable resistor 127 to the junction of cathode resistors 128 and 129 so that the signal from the dummy line balances out corresponding components of the signal applied to the grid of amplifier 126. As previously stated, the balancing action resulting from the dummy line makes it possible to use single ended circuits so that simple equalization circuits can be used. The output of the amplifier 126 is applied to the cascode amplifier formed by tubes 130 and 131. The output of the cascode amplifier is applied to triode 132 which functions as a phase splitter to provide a balanced output.

The balanced output from the tube 132 is applied to triodes 133 and 134 which constitute the first tubes of identical amplifier sections which provide the two balanced paths for the signal. The amplifier 133 is coupled to amplifier 135 which is in turn coupled to amplifiers 136 and 137, the latter two being connected in parallel. Each of these three amplifiers include a pentode tube to provide high gain. Similarly, tube 134 in the upper line has its output connected to pentode 138 which feeds the parallel connected pentodes 139 and 140. The output terminals 141 are arranged to provide either a balanced output or a single ended output through operation of switch 142. The switch is shown in the position for single ended operation, with the output being taken between either terminal 141 and ground. For balanced operation, the switch connects resistors 143 and 144 in the circuit and the output is taken between the terminals 141.

In order to hold the line amplifier gain uniform over a very wide band of frequencies, negative feedback is used. A negative feedback circuit is provided between amplifier stages 126 and 130, 131 and 132. The feedback circuit is connected from the junction of cathode resistors 145 and 146 of the phase splitter 132 and continues through attenuating resistor 147 to the cathode of tube 126. Condensers 148, 149 and 150 provide a shunt path which can be adjusted by variation of the capacity of condenser 150 to adjust the response in the mid frequency band. Condenser 151 and resistor 152 form a fixed shunt for providing fixed attenuation of frequencies within the band. Condenser 153 and resistors 154 and 155 provide a path for adjusting the high frequency response by adjustment of resistor 154. The feedback path is in effect an attenuating circuit which controls the attenuation at various frequencies. By controlling the attenuation of the signal fed back, the negative feedback circuit controls the gain of the amplifier system.

A negative feedback circuit is also provided for the amplifier section formed by tubes 134, 138, 139 and 140. In this circuit the feedback signal is derived across resistor 160 which is common to the cathodes of the tubes 139 and 140. This feedback is applied in a positive sense through resistor 161 to the cathode of tube 138. This increases the gain of the amplifier section which permits the use of a large amount of negative feedback between the output stages and the first stage 134. By having a very high gain amplifier so that a large amount of negative feedback can be used, the frequency response of the amplifier may be controlled almost entirely by the negative feedback path. For this reason it is desirable to have a very high gain and use a very large amount of negative feedback. The feedback path continues through resistor 162 to the cathode of the triode 134. Bridged across resistor 162 are condensers 163 and 164, and at the junction of the condensers, the series circuit including resistor 165 and condensers 166 and 167 is connected to ground. The circuit including resistors 162 and 165 and condensers 163, 164, 166 and 167 forms an attenuator which applies a reduced voltage to the cathode of tube 134. The response of this attenuator is controlled by adjustable resistor 165 and adjustable capacitor 166. The capacitor 166 controls the attenuation and correspondingly the negative feedback in the mid frequency portion of the band, and at the high frequency portion the reactance of capacitor 166 is small and resistor 165 is effective to control the attenuation. Accordingly, the control elements 165 and 166 permit adjustment of the gain as may be desired to level out the response of the entire system.

The amplifier section includes tubes 133, 135, 136 and 137 has a feedback circuit exactly identical to that of the amplifier section including tubes 134, 138, 139 and 140. Accordingly, it will not be necessary to repeat the description of this feedback circuit.

As previously stated, the test oscillator can be used to set the gain of the receiver. By operating the test oscillator at the third switch position, normal deviation is produced by the microwave modulator. Under such conditions a meter may be connected to the output terminals 141 of line amplifier 46. The gain of the amplifier can then be adjusted by adjustment of potentiometer 125 at the input of video line amplifier 46.

Figures 7, 8, 9:
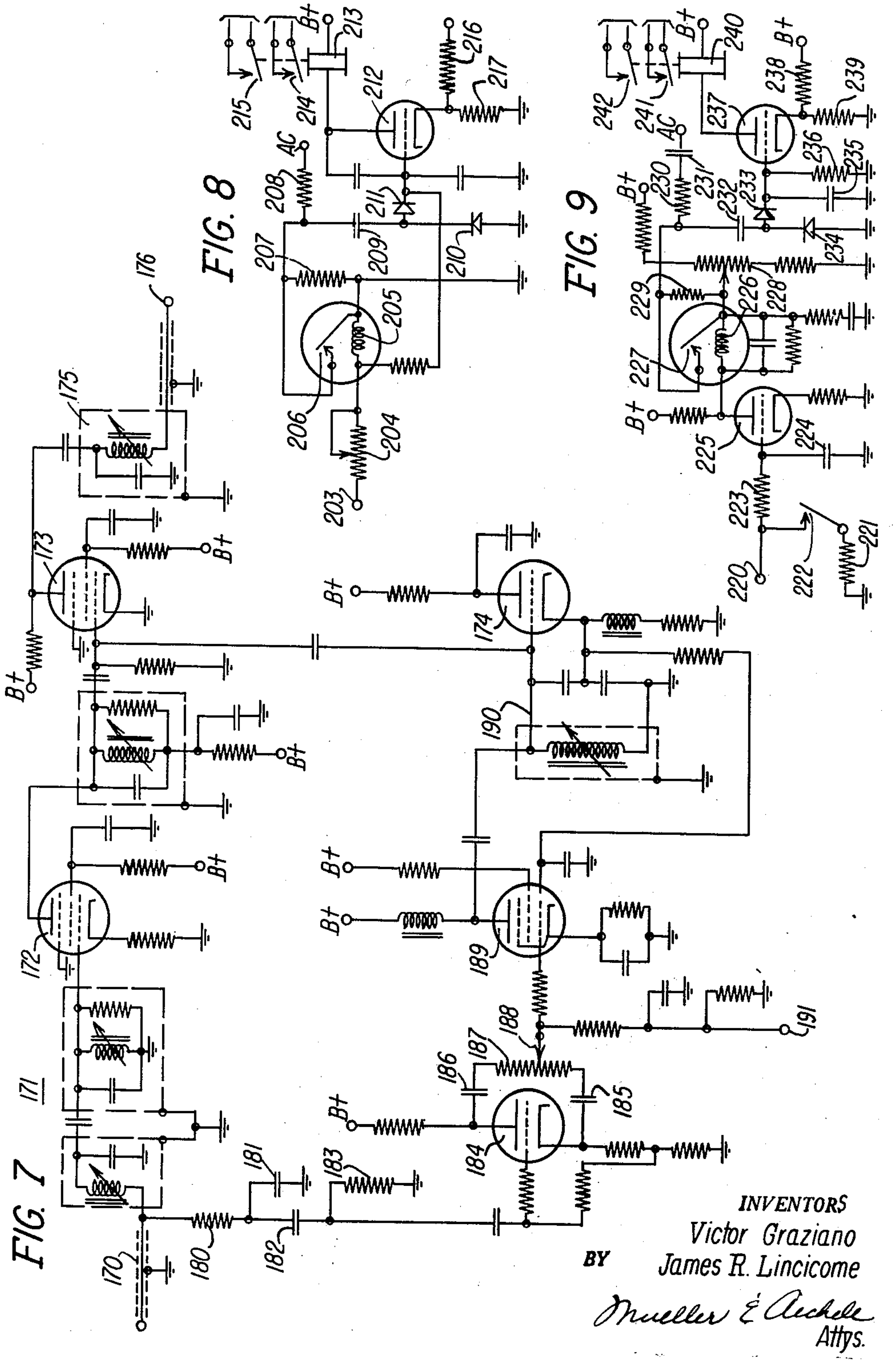
Fig. 7 is a circuit diagram of the audio converter of the receiver.
Fig. 8 illustrates the failure sensing circuit used in the transmitter.
Fig. 9 illustrates the failure sensing circuit used in the receiver.

Fig. 7 shows the detailed circuit diagram of the audio converter 47 of the system of Fig. 1. The video signal and the audio subcarrier at the output of the video pre-amplifier are applied through coaxial cable 170 to the converter. The tuned circuit 171 selects the audio subcarrier and applies the same to amplifier 172. Amplifier 172 further selects the subcarrier and applies the same to mixer 173. Oscillations from a local oscillator 174 are also applied to the mixer 173 to produce an intermediate frequency output which is selected by tuned circuit 175 and applied to output terminal 176. As previously stated the audio subcarrier becomes phase modulated by the video signal as the audio subcarrier and video signal are applied together through the transmitter and receiver of the microwave system. To balance out this phase modulation, the video signal is derived from the input line 170, with the audio subcarrier being removed by the filter including resistor 180 and condenser 181. the video signal is then differentiated by the circuit including condenser 182 and resistor 183. The differentiated video signal is applied to phase splitter 184 which provides the video signal at opposite phases at the plate and cathode thereof. The opposite phase video signals are applied through condensers 185 and 186 to resistor 187, and the adjustable tap 188 on resistor 187 permits selection of the video signal at any desired phase relationship through a range of 180°.

The video signal is applied to reactance modulator 189 which controls the frequency of local oscillator 174 by effecting the tuning of the tuned circuit 190. This frequency modulates the local oscillator 174, but since the video signal has been differentiated the effect is substantially the same as phase modulation thereof. The phase modulation on the local oscillations counteracts the phase modulation on the audio subcarrier so that the output of the mixer is substantially free of video modulation. An AFC potential may be applied from the audio detector to terminal 191 to shift the frequency of the local oscillator to provide the desired intermediate frequency.

In Fig. 8 there is shown the transmitter sensing circuit which is represented on Fig. 1 as item 39. A coupler 200 on the wave guide 86 connected to the transmitter klystron, shown in Fig. 2, contains a crystal 201 which provides a relatively wide band response. This crystal is coupled to an output terminal 202 which is connected to the input terminal 203 of Fig. 8. The voltage from the crystal 201 is applied through resistor 204 to the winding 205 of a sensitive meter relay. This meter relay includes contacts 206 which are normally open when the current flows in the winding 205, but which are closed when the current is reduced. The contacts are bridged across resistor 207 which is connected in series with resistor 208 to a source of alternating current. Accordingly an alternating current voltage normally appears across resistor 207, but this voltage is removed when the contacts 206 close.

The voltage across resistor 207 is applied to the rectifier doubler circuit including condenser 209 and rectifiers 210 and 211. This circuit provides a bias voltage to the grid of the tube 212 so that this tube normally conducts. The tube when conducting holds the relay 213 energized so that the contacts 214 and 215 are open. However, when the meter contacts close and the voltage is removed from resistor 207, there is no voltage on the grid of triode 212 so that this tube is rendered non-conducting. It will be noted that a positive potential is applied to the cathode of triode 212 from the B plus source through resistors 216 and 217 which form a voltage divider. This potential holds the triode non-conducting until a positive biasing voltage is applied to the grid thereof.

When the relay 213 releases, contacts 214 close to establish a circuit to a pilot light on the transmitter to indicate to an operator that the transmitter is not operating properly. Contacts 215 may control a circuit to a remote point to indicate the condition of the transmitter. The contacts 215 may be used with any desired type of control such as a land line. The power sensing circuit wherein alternating current is used instead of a direct current has been found to be highly advantageous since arcing of the contacts of the meter is greatly reduced and improved operation takes place.

In Fig. 9 there is shown the power sensing circuit for the receiver of the microwave relay system. The input terminal 220 is connected to the IF strip 44 from which a negative voltage is obtained when signals are being amplified through the intermediate frequency amplifier. A resistor 221 may be selectively connected to the input terminal 220 through switch 222 to reduce the level of the voltage applied. The voltage is applied through resistor 223 and across condenser 224 to the grid of amplifier 225. The output of the amplifier is applied to the coil 226 of the meter relay which may be identical to the meter relay of Fig. 8. A positive potential is applied through the relay coil 226 from a potentiometer 228 connected between B plus potential and ground.

The contacts 227 of the meter relay are connected across resistor 229 which is connected from potentiometer 228 to resistor 230 and condenser 231 which apply a potential from a source of alternating current. The resistor 229 is also connected to the voltage doubler circuit including condenser 232, and rectifiers 233 and 234, with the rectified voltage being applied across condenser 235 and resistor 236 to the grid of the control tube 237. The potential applied to the rectifiers will therefore include the potential of the potentiometer 228 and the alternating potential across resistor 229. The potential across resistor 229 is removed when the meter closes due to reduction of the signal from the intermediate frequency amplifier. This will reduce the alternating current voltage rectified by the voltage doubler so that the tube 237 will be rendered non-conducting. The voltage applied from B plus through resistors 238 and 239 to the cathode of the tube 237 assures that the tube is cut off when the grid voltage is removed. However, normally the grid voltage applied to the relay tube 237 is sufficient to render the same conducting. Tube 237 when conducting holds relay 240 operated to hold contacts 241 and 242 open. However, when the relay falls out contacts 241 close to energize a pilot light on the receiver, and contacts 242 similarly close to provide a remote indication. The remote indication may be accomplished through any suitable means such as a land line.

Figure 10:
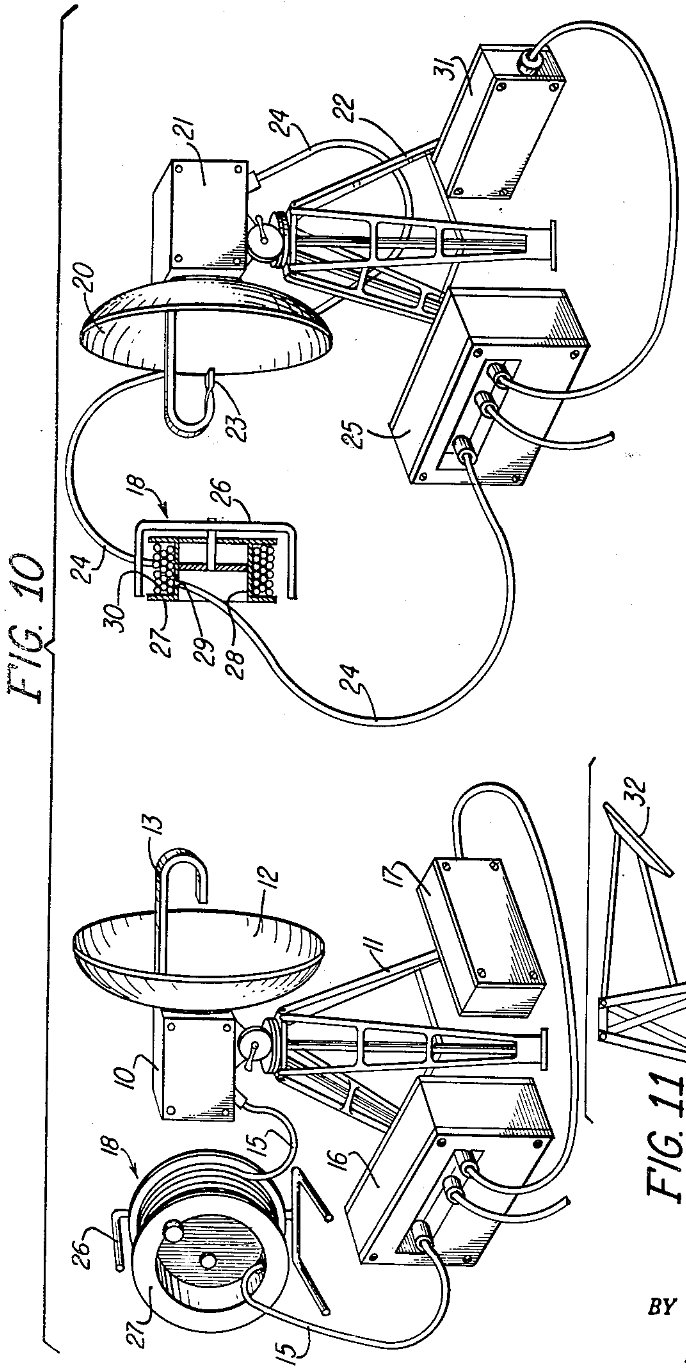
Fig. 10 illustrates a portable version of the color television microwave relay system.

Referring now to Fig. 10 of the drawings, the microwave color relay system is illustrated mounted for portable use in this figure. As previously stated the equipment may be packaged either for portable use or for fixed use, in the latter case the units being provided in fixed mounting racks. In the portable equipment, the transmitter includes a microwave modulator in a housing 10 which is mounted on tripod 11. The housing includes a rigid frame for connection to the tripod, which includes provisions for mounting the parabolic reflector 12 for reflecting waves from the horn antenna 13. The housing 10 in addition to including the microwave modulator may also include the video amplifier for feeding the modulator. Connected to the housing 10 through cable 15 is the housing 16 containing the balun amplifier to which the output of the television camera equipment is applied. The housing 16 may in addition include power supplies, and further power supplies for the equipment are provided in housing 17. The cable 15 is provided on a reel 18 to facilitate carrying the same and also to provide compact storage of the part of the cable not required to span the distance involved. The parabolic reflector 12 of the antenna will be aligned by adjustment of the tripod head to direct signals to the receiver unit.

The receiver unit includes a housing 21 which is supported on a tripod 22, with a horn type antenna 23 picking up the signals from the reflector 20 and applying the same to the microwave receiving equipment in the housing 21. The housing 21 may include IF amplifiers and detectors, and a video pre-amplifier which produces a video signal applied through cable 24 to the video line amplifier in housing 25. The housing 25 includes in addition to the video amplifier certain power supplies, and further power supplies are provided in the housing 31.

The cable reel 18 at the receiver is shown in section to illustrate the construction thereof. It will be noted that the carrying frame and stand 26 support the reel proper 27 for pivotal movement. The reel includes a recessed portion 28 into which the cable on the spool 30 is fed through an opening 29, so that one connector is provided on a short end of the cable which may be contained in the recess 28, with the remainder of the cable and the other connector being received on the spool 30. Accordingly the reel can be used to unwind the desired amount of cable with the remainder of the cable being left on the reel. The inner end of the cable is always accessible since this end is provided in the recess 28.

Figure 11:
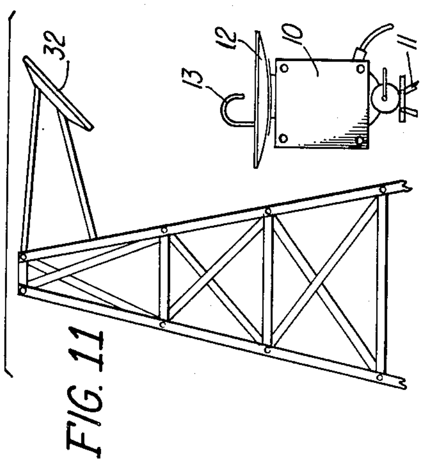
Fig. 11 illustrates the microwave transmitter or receiver mounted for use with a reflector.

The housings 10 and 21 of the microwave equipment mounted on the tripods have rigid frames which are arranged so that the housings may be mounted at two different right angle positions. Fig. 11 shows the transmitter housing 10 mounted with the reflector 12 thereon facing upwardly. In such case a flat reflector 32 may be provided for directing the waves horizontally. In such a system the receiver would also have a flat reflector above the reflector 20 thereof, with the housing mounted on the tripod at a right angle position with respect to that shown in Fig. 10.

Figure 12:
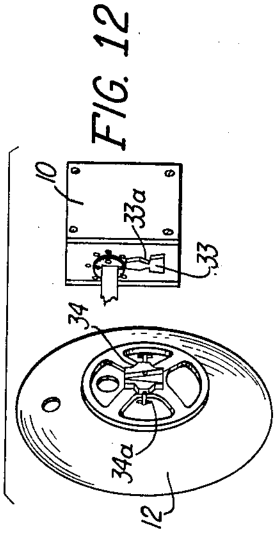
Fig. 12 shows the disengagable connection of the microwave reflector with the transmitter or receiver housing.

Fig. 12 shows the manner of connection of the reflectors to the equipment housing. A wedge shaped block 33 is provided on the housing 10 and is arranged to mate with a wedge shaped recess in a block 34 on the reflector 12. Accordingly, the blocks may be interengaged to mount the reflector on the housing, the blocks having dovetailed edges so that they cannot be separated by direct outward movement. Screws 34a are threaded in the block 34 and adapted to engage recesses 33a in the block 33 to positively anchor the reflector with respect to the block.

It will be seen from the foregoing that a complete microwave transmission system for color television signals is provided. The system includes important novel features which make it possible to transmit the wide band signal required with a minimum of distortion so that the television picture and sound signals can be faithfully reproduced. The overall system has been simplified by the improved negative feedback amplifier circuits which provide control of responses over a wide frequency band by use of very simple circuit arrangements. The differential gain controlling circuit holds variations in amplitude at the same level over wide amplitude ranges to eliminate the tendency for distortion from such variations.

The system may be provided in either fixed or portable form with the portable form making it easy to move and set up the equipment for operation. The cable required for interconnecting components includes a coupling line and also a dummy line to balance out signals picked up by the cable. This arrangement makes it possible to use single ended amplifiers which may be more easily equalized so that the overall equipment is greatly simplified. A balancing arrangement is also provided for eliminating phase modulation of the frequency modulated audio subcarrier wave by the video components. This is effective to maintain high fidelity audio reproduction as well as accurate video reproduction. Features of the system are applicable in other communication systems in addition to the particular system disclosed. These features have been found to cooperate uniquely in the system disclosed to provide a highly satisfactory system.

We claim:

1. A color television transmission system including in combination a transmitting portion including a balanced amplifier for receiving a wide band video signal, subcarrier transmitting means for modulating a subcarrier wave by an audio signal, first video amplifier means for combining said wide band video signal and said audio subcarrier wave into a composite signal and amplifying the same, and transmitter means for frequency modulating a carrier wave by said amplified composite signal, and a receiver portion including a superheterodyne receiving section having an intermediate frequency amplifier, a detector and an output coupling circuit, second video amplifier means connected to said coupling circuit for amplifying the composite signal therefrom, third video amplifier means for deriving the video signal from said composite signal and for amplifying the same, audio converter means for deriving the audio signal from said composite signal and for reducing the frequency thereof, and audio detector and amplifier means for providing an audio output signal, said first and third video amplifiers each including a pair of electron discharge valves having cathodes to which signals having substantially the same phase are applied, and an attenuator circuit interconnecting said cathodes for providing negative feedback from the forward one of said valves to the rearward one of said valves, said attenuator circuit including a shunt path including a variable resistor and a variable capacitor for controlling the frequency response of said amplifier, said coupling circuit including a cathode follower stage with a rectifier connected between the cathode thereof and a direct current potential to vary the loading with signal level to change the differential gain of the system, and said convertor means including a local oscillator and means for frequency modulating said local oscillator by a wave derived from said video signal for cancelling modulation of said subcarrier wave by said video signal during the transmission of said composite wave.

2. A color television transmission system including in combination a transmitting portion including a balanced amplifier for receiving a wide band video signal, first video amplifier means for amplifying said wide band video signal, and means for frequency modulating a carrier wave by said amplified video signal, and a receiver portion including a superheterodyne receiving section having an intermediate frequency amplifier, a detector and an output coupling circuit, second video amplifier means connected to said coupling circuit for amplifying the video signal therefrom, said first and second video amplifiers each including a pair of electron discharge valves having cathodes to which signals having substantially the same phase are applied, and an attenuator circuit interconnecting said cathodes for providing negative feedback from the forward one of said valves to the rearward one of said valves, said attenuator circuit including a shunt path including a variable resistor and a variable capacitor for controlling the frequency response of said amplifier, and test oscillator means adapted to selectively apply oscillations at first and second levels to said first video amplifier means, meter means connected to said frequency modulating means for indicating the amplitude of the modulated carrier wave, said first video amplifier means including a gain controlling portion for setting the gain thereof so that said meter indicates reduction of amplitude of said modulated carrier wave in response to test signals of the first higher level, said second amplifier including a variable gain portion for setting the gain thereof to produce the desired output level in response to test signals of the second lower level.

3. A portable color television transmission system including in combination, a transmitting portion including a balanced amplifier for receiving a wide band video signal, subcarrier transmitting means for frequency modulating a subcarrier wave by an audio signal, first video amplifier means for combining said wide band video signal and said audio subcarrier wave into a composite signal and amplifying the same, means for frequency modulating a carrier wave by said amplified composite signal and for radiating the same, said transmitter portion being mounted in portable housings with one housing containing said frequency modulating means and supporting said radiating means thereon, and tripod means for supporting said one housing and adapted to be connected thereto at first and second portions for directing waves in different right angle directions, and a receiver portion including a superheterodyne receiving section of receiving the radiated wave, said receiving section having an intermediate frequency amplifier, a detector and an output coupling circuit, second video amplifier means connected to said coupling circuit for amplifying the composite signal therefrom, third video amplifier means for deriving the video signal from said composite signal and for amplifying the same, audio converter means for deriving the audio signal from said composite signal and for reducing the frequency thereof, audio detector and amplifier means for providing an audio output signal, said receiving portion being mounted in portable housings with a particular housing containing said superheterodyne receiving section and supporting wave receiving means therefor, and tripod means for supporting said particular housing in a position to receive waves from said transmitting portion, said first and third video amplifiers each including a pair of electron discharge valves having cathodes to which signals having substantially the same phase are applied, and an attenuator circuit interconnecting said cathodes for providing negative feedback from the forward one of said valves to the rearward one of said valves, said attenuator circuit including a shunt path including a variable resistor and a variable capacitor for controlling the frequency response of said amplifier, said coupling circuit including a cathode follower stage with a rectifier connected between the cathode thereof and a direct current potential to vary the loading with signal level to change the differential gain of the system, said converter means including a local oscillator and means for frequency modulating said local oscillator by a wave derived from said video signal for cancelling modulation of said subcarrier wave by said video signal during the transmission of said composite wave, at least one interconnected set of components of the system being of the single ended type and being mounted in housings spaced at a distance from each other, a coaxial cable interconnecting said set of components, a dummy coaxial cable positioned along said interconnecting coaxial cable, and means for applying the signal picked up by said dummy coaxial cable to balance out low frequency interference picked up by said interconnecting coaxial cable.

4. In a color television transmission system, an amplifier for amplifying a wide band of frequencies extending to approximately 7 megacycles, and including first and second electron discharge valves each having cathode, anode and control grid electrodes, said electron valves being connected in a cascade amplifier circuit and having signals on the cathodes thereof of substantially the same phase, resistor means connecting said cathode of said first valve to a reference potential, resistor means connecting said cathode of said second valve to said reference potential, and an attenuating network connecting said cathode of said second valve to said cathode of said first valve to provide negative feedback therebetween, said feedback network including a first branch circuit isolated from said reference potential and coupling said cathode of said second valve to said cathode of said first valve and a second branch circuit connected from said first branch circuit to said reference potential, said second branch circuit having in series therein capacitor means and resistor means, the value of said capacitor means affecting the gain of the amplifier principally in a region intermediate the ends of the wide band and the value of said resistor affecting the gain of said amplifier principally in the high frequency region of the wide band of said amplifier.

5. In a color television transmission system, an amplifier for amplifying a very wide band of frequencies including a plurality of amplifier stages each having input and output circuits and an electrode common to said input and output circuits, said common electrodes of first and second of said stages having signals thereon which are of substantially the same phase, resistor means connecting said common electrode of said first stage to a reference potential, resistor means connecting said common electrode of said second stage to said reference potential, and a feedback network connecting said electrode of said second stage to said electrode of said first stage to provide negative feedback therebetween, said feedback network including an attenuating circuit having first and second portions connected in series from said electrode of said second stage to said reference potential, and means connecting the junction of said first and second portions to said electrode of said first stage, said second portion including capacitor means and resistor means connected in series, the value of said capacitor means affecting the gain of the amplifier in a region intermediate the ends of the wide band and the value of said resistor controlling the gain of said amplifier in the high frequency region of the wide band of said amplifier.

6. An amplifier for amplifying a frequency band having an extent of the order of 7 megacycles, said amplifier including first and second electron discharge valves with input and output circuits and each having an emission electrode, said electron valves being connected in a cascade amplifier circuit, resistor means connecting said emission electrode of said first valve to a reference potential, resistor means connecting said emission electrode of said second valve to said reference potential, and an attenuating network connecting said electrode of said second valve to said electrode of said first valve to provide negative feedback therebetween, said attenuating network including a first branch circuit isolated from said reference potential and coupling said electrode of said second valve to said electrode of said first valve and a second branch circuit connected to said first branch circuit and to said reference potential and having in series therein capacitor means and resistor means, the value of said capacitor means affecting the gain of the amplifier principally in a region intermediate the ends of the frequency band and the value of said resistor affecting the gain of said amplifier principally in the high frequency region of the frequency band.

7. In a frequency modulation communication system operating in the microwave frequency range and including transmitting means having modulating signal amplifier means with at least one variable gain portion and frequency modulating means for modulating a carrier wave by the amplified modulating signal, and frequency modulation receiver means having detector means and variable gain amplifier means for amplifying the detected signal; apparatus for setting the deviation of said frequency modulating means, and the output level of the receiver including in combination, oscillator means adapted to provide oscillations of first and second amplitudes, means for selectively connecting said oscillator means to said amplifier means of said transmitting means at a point thereon ahead of said variable gain portion, meter means connected to the output of said modulating means to indicate the amplitude of the carrier wave produced thereby, said oscillations of first amplitude producing deviation of the modulated carrier wave of such extent that the amplitude of the modulated carrier wave is reduced when said portion of said amplifier means of said transmitting means is adjusted to provide a predetermined gain, said oscillations of second amplitude providing signals of proper amplitude to produce the desired deviation of said frequency modulated wave and serving as a test signal for setting the gain of said amplifier means of said frequency modulation receiver means.

8. A portable frequency modulation system operating in the microwave frequency range including transmitting means provided in portable housings, said transmitting means having modulating signal amplifier means with at least one variable gain portion and frequency modulating means for modulating a carrier wave by the amplified modulating signals, apparatus within said housings for setting the deviation of said frequency modulating means, including oscillator means combined in a housing with said amplifier means, means for selectively connecting oscillations from said oscillator means to said amplifier means at a point thereon ahead of said variable gain portion, and meter means connected to the output of said modulating means to indicate the amplitude of the carrier wave produced thereby, said oscillator means being calibrated so that oscillations therefrom are at a level which produces deviation of the modulated carrier wave of such extent that the amplitude of the modulated carrier wave is reduced when said portion of said amplifier means is adjusted to provide the desired gain.

9. In a color television transmission system including transmitter means for frequency modulating a carrier wave by a composite signal including a color video signal and a frequency modulated audio subcarrier wave having a frequency above the band of the video signal, and receiving means for deriving the composite signal from the carrier wave, with the frequency modulated subcarrier wave being phase modulated by the video signal during transmission thereof; converter means in the receiving means for reducing the frequency of the frequency modulated audio subcarrier wave including in combination, mixer means, frequency selective means for deriving the audio subcarrier wave from the detected composite signal and applying the audio subcarrier wave to said mixer means, frequency selective means for deriving the video signal phase modulation components from the detected composite signal, means for differentiating the video signal modulation components, phase selection means for providing the differentiated video signal modulation components with a desired phase relationship, a local oscillator, frequency modulator means for modulating said local oscillator by said differentiated video signal modulation components of said desired phase, and means for applying oscillations from said modulated local oscillator to said mixer means, with the frequency modulation produced by said differentiated video signal modulation components providing in effect phase modulated local oscillations to balance out in said mixer means phase modulation of the subcarrier wave by said video signal.

10. In a communication system including transmitter means for frequency modulating a carrier wave by a composite signal including a wide band signal and a frequency modulated subcarrier wave having a frequency above the frequency of the wide band signal, and receiving means for deriving the composite signal from the carrier wave, with the frequency modulated subcarrier wave being phase modulated by the wide band signal during transmission thereof; converter means in the receiving means for reducing the frequency of the frequency modulated subcarrier wave including in combination, mixer means, frequency selective means for deriving the subcarrier wave from the detected composite signal and applying the audio subcarrier wave to said mixer means, frequency selective means for deriving the wide band signal phase modulation components from the detected composite signal, means for differentiating the wide band signal modulation components, phase selection means for providing the differentiated signal with a predetermined phase relationship, a local oscillator, frequency modulator means for modulating said local oscillator by said differentiated signal of said predetermined phase, and means for applying oscillations from the frequency modulation produced by said differentiated signal providing phase modulation of said local oscillator to said mixer means, with said modulated local oscillations to balance out in said mixer means phase modulation of the subcarrier wave by said video signal.

11. A portable radio relay system for transmitting wide band color television signals including a first portable housing containing therein frequency modulating means, tripod means for supporting said housing, antenna means for connection to said frequency modulating means and including a horn antenna and a reflector removably secured to said housing, said horn antenna and said reflector being held in fixed positions on said housing for directing waves therefrom in a predetermined direction, and first and second blocks connected to said housing and said reflector respectively and providing a dove tail interconnection therebetween, and a screw in one of said blocks adapted to engage a recess in the other block to lock said blocks in interconnected engagement, said housing including a first mounting portion for supporting said housing on said tripod means so that waves are directed vertically by said reflector, and said housing including a second mounting portion positioned at right angles to said first mounting portion for mounting said housing on said tripod means so that waves are directed horizontally by said reflector.

12. A portable radio relay system including a first portable housing containing therein frequency modulating means, tripod means for supporting said housing, and antenna means for connection to said frequency modulating means including a horn antenna and a reflector removably secured to said housing, said horn antenna and said reflector being held in fixed positions on said housing for directing waves therefrom in a predetermined direction, said housing including a rigid frame having a first portion for supporting said reflector and first and second mounting portions for securing said housing to said tripod means, said first and second mounting portions being positioned at right angles to each other for mounting said housing on said tripod means so that waves are directed from said reflector in a horizontal direction when said first mounting portion is secured to said tripod means and in a vertical direction when said second mounting portion is secured to said tripod means.

References Cited in the file of this patent

UNITED STATES PATENTS

| | | |
|---|---|---|
| 1,917,016 | Burton | July 4, 1933 |
| 2,224,699 | Rust | Dec. 10, 1940 |
| 2,272,839 | Hammond | Feb. 10, 1942 |

| | | |
|---|---|---|
| 2,284,219 | Loughren | May 26, 1942 |
| 2,445,708 | Crosby | July 20, 1948 |
| 2,506,770 | Braden | May 9, 1950 |
| 2,512,530 | O'Brien et al. | June 20, 1950 |
| 2,547,213 | Johnson et al. | Apr. 3, 1951 |
| 2,553,368 | Green | May 15, 1951 |
| 2,583,345 | Schade | Jan. 22, 1952 |
| 2,647,989 | Hilburn | Aug. 4, 1953 |
| 2,708,716 | Boothroyd | May 17, 1955 |
| 2,734,944 | Green et al. | Feb. 14, 1956 |
| 2,827,629 | Rounsefell | Mar. 18, 1958 |

OTHER REFERENCES

Radio System Engineering, M.I.T. Series, vol. I, pages 286, 287.